United States Patent
Xu et al.

(10) Patent No.: US 7,692,343 B2
(45) Date of Patent: Apr. 6, 2010

(54) HIGH MAGNETIC RELUCTANCE MOTOR ASSEMBLY

(75) Inventors: Mo Xu, Singapore (SG); Pohlye Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/969,659

(22) Filed: Oct. 20, 2004

(65) Prior Publication Data
US 2006/0082229 A1      Apr. 20, 2006

(51) Int. Cl.
*H02K 5/00*      (2006.01)
*G11B 17/02*     (2006.01)

(52) U.S. Cl. ...................... 310/67 R; 310/90

(58) Field of Classification Search ............. 310/67 R, 310/51, 90, 91, 98.07, 99.08; 360/98.07, 360/99.08
See application file for complete search history.

(56) References Cited

U.S. PATENT DOCUMENTS

| | | | |
|---|---|---|---|
| 4,647,803 A * | 3/1987 | von der Heide et al. ....... 310/51 |
| 5,254,895 A * | 10/1993 | Koizumi ................ 310/156.06 |
| 5,479,304 A | 12/1995 | Morita |
| 5,600,511 A * | 2/1997 | Dunfield et al. .......... 360/97.02 |
| 6,144,124 A | 11/2000 | Nakagawa |
| 6,384,495 B1 | 5/2002 | Suzuki |
| 6,407,882 B1 | 6/2002 | Katahara |
| 6,522,498 B1 | 2/2003 | Lim |
| 6,534,890 B2 | 3/2003 | Rafaelof |
| 6,566,776 B2 | 5/2003 | Hoffmann |
| 6,608,734 B1 | 8/2003 | Herndon |
| 6,997,294 B2 * | 2/2006 | Ochiai et al. .................. 192/35 |
| 2001/0007519 A1 | 7/2001 | Nishio |
| 2002/0030926 A1 * | 3/2002 | Teshima .................. 360/99.08 |
| 2003/0099061 A1 | 5/2003 | Bahirat |
| 2003/0218826 A1 | 11/2003 | Hong |

FOREIGN PATENT DOCUMENTS

JP      03018239 A  *  1/1991

OTHER PUBLICATIONS

Translation of Kinoshita et al., JP 03018239.*
Hayt, William Hart, Engineering Electromangetics, McGraw-Hill 1981, p. 320.*
Chen, Wai-Kai, The Electrical Engineering Handbook, 2005, pp. 477-497.*

* cited by examiner

*Primary Examiner*—Quyen Leung
*Assistant Examiner*—David W. Scheuermann
(74) *Attorney, Agent, or Firm*—Shumaker & Sieffert, P.A.

(57) ABSTRACT

A motor assembly in which magnetic attraction between the magnets and the base of the motor is reduced by providing increased magnetic reluctance. This is achieved without the need to increase the overall height of the motor assembly, thus making the motor assembly particularly suitable for use in applications with tight space constraints and power consumption limitations.

32 Claims, 3 Drawing Sheets

HIGH MAGNETIC RELUCTANCE MOTOR ASSEMBLY

FIELD OF THE INVENTION

The present invention relates generally to motors or assemblies including motors. More particularly, the present invention relates to small motor assemblies or motor base assemblies of reduced power requirements.

BACKGROUND OF THE INVENTION

Motors typically include a stationary portion and a revolvable portion. The revolvable portion may carry a set of magnets, which when in interaction with a set of stator windings carried on the stationary portion, generates forces that causes the revolvable portion to rotate relative to the stationary portion.

In tandem with the miniaturization of portable consumer electronic products, there is a need for small motors with low power consumption. One difficulty with a small motor is that attractive forces between the magnets and certain non-moving parts of the motor (or parts of an assembly including the motor) may present undesirable resistance to the rotation of the revolvable portion. Thus, the motor may require more power to start up. Making the motor bigger may not be a desirable solution because that may result in a larger consumer electronic product, or even higher power consumption to move the larger motor parts.

There is therefore a need for motors are small enough for use in increasingly smaller consumer electronic products, and yet require less power to operate.

SUMMARY OF THE INVENTION

An improved motor or motor base assembly having magnets positioned further away from a non-moving component than from stator components that are configured to generate desired forces. Optionally, the distance is twice as long. To weaken attractive forces between the magnets and the non-moving component, the magnetic reluctance therebetween is increased. Various embodiments are described, including providing an undercut or offset in the non-moving component, thereby increasing the path traveled by magnetic flux in a medium having a relatively higher magnetic reluctance. [Some embodiments involve having or more material disposed between the magnet and the non-moving component, the material being characterized by a higher magnetic reluctance than the non-moving component.]

DETAILED DESCRIPTION

A variety of hand-held or mobile products may incorporate motors or be used with other products that use motors. Examples include personal digital assistants, game stations, mobile phones, personal entertainment devices, cameras, and data storage devices. The following description is therefore intended to only illustrate various embodiments and applications of the present invention, and is not intended to be limiting.

Figure 1:
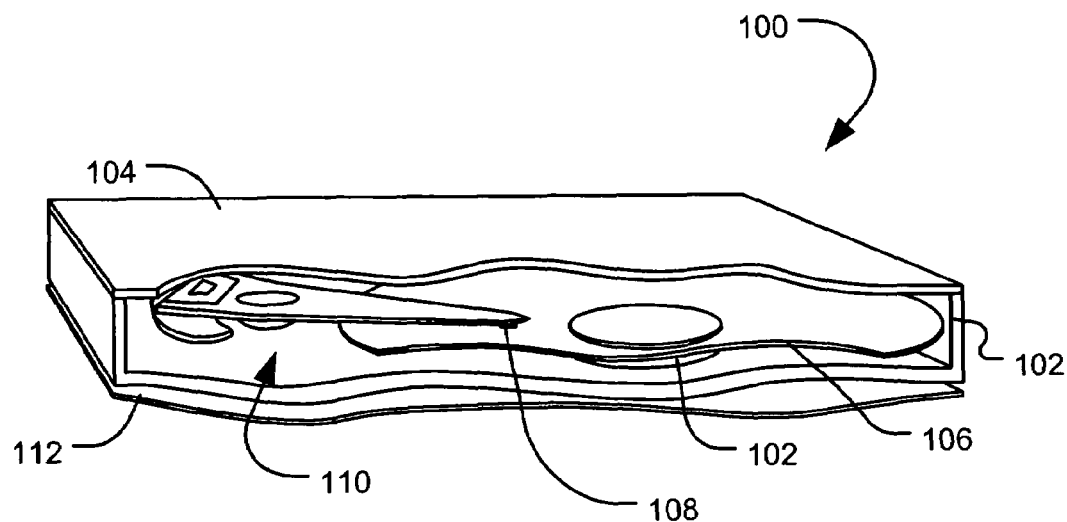
FIG. 1 is a diagrammatic drawing of a product incorporating a motor.

FIG. 1 shows an example of a product 100, such as a data storage device, incorporating a motor 102. The product 100 includes a housing 104, within which may be found media 106 for storing data and read/write transducers 108 for writing or reading data to or from the media. In the example shown, the media may be in the form of one or more discs that are mounted to the motor 102. Read/write transducers may be supported by an actuator 110 that operates to position the read/write transducers relative to the media for reading or writing operations. Part of the electronic circuitry for controlling the operations of the product may be in the form of a printed circuit board assembly 112. For the sake of clarity, only one disc is shown in this example. A different number of discs may be mounted to the motor, with a corresponding number of read/write transducers to interface with the desired number of media surfaces. Other products may incorporate motors directly or by virtue of having data storage devices included therein. The present invention may be found in various embodiments in any of these applications.

Figure 2:
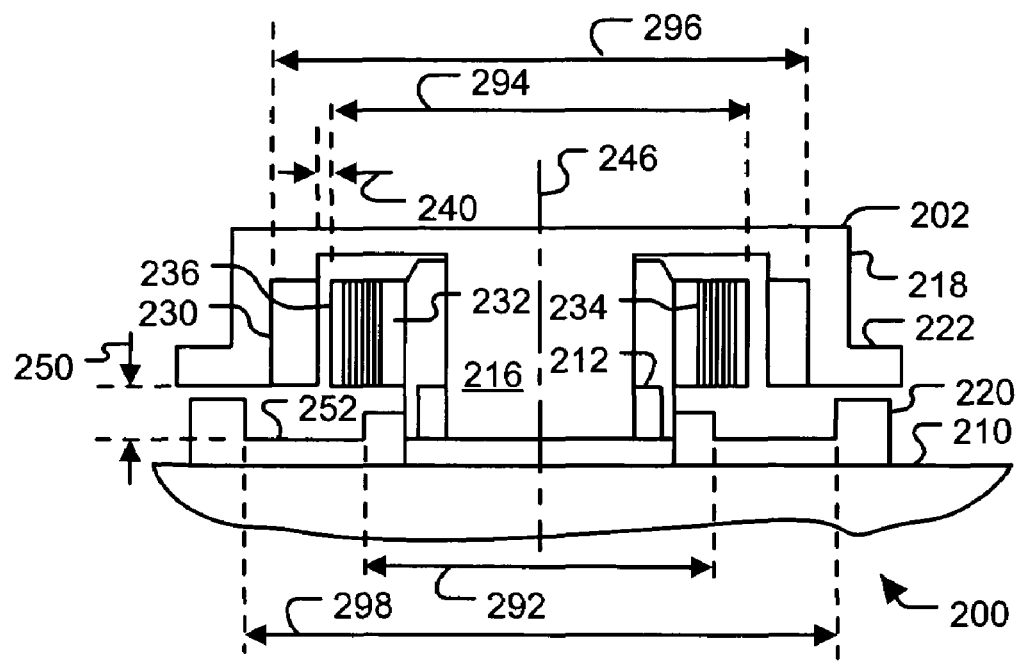
FIG. 2 is a cross-sectional view of a motor assembly according to one embodiment of the present invention.

FIG. 2 shows in greater detail, in cross-section, a partial view of an assembly 200 that includes a motor 202. In this example, the assembly 200 uses bearings 212 that operate on fluid dynamic principles to provide for rotational motion of the rotatable (or revolvable) part of the motor (generally referred to as the rotor) relative to the stationary part of the motor. The bearings may be formed by the presence of a fluid between a thrust plate and a counter plate. It will be understood that embodiments of the present invention may be found in motors having other types of bearings, such as ball bearings. In the center of the motor 202 is a shaft 216 that supports a hub 218 above a base 220. The hub 218 extends outward radially to form a flange 222 for supporting other assembly components for rotational motion.

The hub 218 may be provided with a set of magnets 230. The base 220 which is configured for mounting to the housing 210 of the product incorporating the motor 202, may be coupled to components 232 configured for carrying current and inducing forces. These components 232 may be in the form of stator windings 234 on stator teeth 236. Stator teeth 236 may be projections extending towards the set of magnets 230. The current-carrying component 232 may optionally be in the form of stator laminations 434, as represented diagrammatically in FIG. 4. For convenience, the components 232 will be referred to generically as the stator. The magnets 230 and stator 232 are arranged to face each other across a gap or a spacing 240. When the stator 232 is energized, electromagnetic interactions between the stator 232 and the magnetic fields from the magnets 230 create forces that cause the hub 218 to rotate relative to the base 220.

The nominal length of the gap 240 between a magnet 230 and a stator 232 affects the magnetic field and hence the forces induced by the interaction of the magnetic field and the current borne in the stator. The distance 240 separating the magnets 230 and the stators 232 of the motor, may also be described in terms of a difference between a radial location of the magnet 230 and that of the stator 232 as taken from some common reference 246 such as the axis of the shaft 216. If the stator 232 includes a stator tooth 236, this radial distance 240 may alternatively be measured in terms of the distance between the magnet 230 and the tip of the stator tooth 236.

Continuing to refer to FIG. 2, in a motor 202 or in an assembly 200 including a motor 202, there may be a magnetizable component or surface 252 in the vicinity of the magnets 230. This magnetizable component or surface 252 may be part of the base 220 of the motor itself. The distance 250 between the magnet 230 and the base 220 or magnetizable surface 252 is set to be more than the distance 240 between the magnet 230 and the stator 232.

In a conventional motor, the distance between a magnet and such a magnetizable component (whether it is part of the motor itself or part of another assembly) is preferably kept to a minimal so as to achieve as low an overall height or thickness as possible for the motor or for the product using the motor. However, this tends to mean that a significant portion of the magnetic flux will travel through such a magnetizable stationary component, in addition to the stator. Thus, this will result in higher resistance forces and higher motor power consumption, especially at start up. In contrast, embodiments of the present invention effect a change to such resistance, equivalent to an extension of the separation between a magnet and a magnetic component, without requiring an increase in the overall height or thickness of the motor or the assembly incorporating the motor. According to embodiments of the present invention, the distance (such as 250) between the source of a magnetic field (such as the magnet 230) and the non-moving support (such as 220) is set to be wider than the distance (such as 240) between the same source of a magnetic field (such as the magnet 230) and the current-carrying component intended to induce electromagnetic forces for operating the motor (such as 232).

Optionally, in some other embodiments where the arrangement of magnets 230 has a larger diameter than the arrangement of stators 232, the motor 202 or assembly 200 is configured such that the inner diameter 292 of the magnetizable surface 252 of the base 220 is smaller than the outer diameter 294 of the stator 232, and the outer diameter 298 of the magnetizable surface 252 of the base 220 is larger than the outer diameter 296 of the magnet 230.

Figure 3:
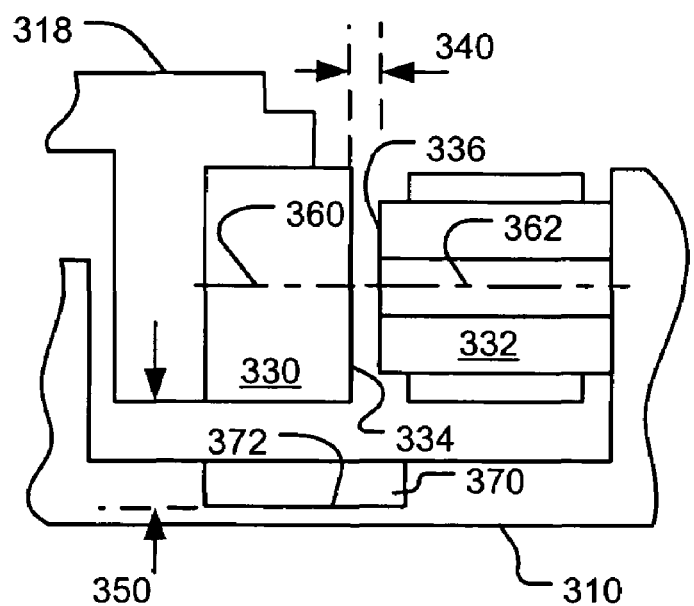
FIG. 3 is a partial cross-sectional view of an arrangement according to another embodiment

Referring to FIG. 3 for a partial cross-sectional view of an arrangement according to another embodiment of the present invention, there is a magnet 330 attached to one part 318 of a motor and a stator 332 attached to a stationary part such as a base 310 of the motor, with these two parts configured for motion relative to each other. These two parts may be separated by a suitable bearing arrangement (not shown). For optimal efficiency of the motor, the magnet 330 and the stator 332 are preferably in axial alignment, that is to say, a centerline 360 of the magnet 330 and a centerline 362 of the stator 332 are at substantially the same elevation or axial displacement from a common reference (such as the base 310).

A first separation 340 between a magnet 330 and a stator 332 in a direction generally transverse to an axis of rotation of the motor may be described in terms of an offset of a stator-facing surface 334 of the magnet 330 from the magnet-facing surface 336 of the stator 332. To enable the first separation 340 to be narrower than the separation between the magnet 330 and a nearest surface of the base 310, there may be provided an indent or a recess 370 in the base 310. The nearest surface to the magnet 330 is thus an indented or recessed surface 372. This effectively increases the distance 350 between the magnet 330 and a nearest magnetizable stationary surface 372, without affecting the axial alignment of the magnet 330 or the stator 332, and also without affecting the overall height of the arrangement.

The magnetic reluctance is increased so that the magnetic attraction between the movable part of the motor 318 and the stationary part of the motor 310 is reduced or made negligible. Accordingly, the motor requires less power to start up and may be characterized by lower power consumption.

The indented surface 372 is located away from the magnet 330 so as to provide an axial distance 350 (between the magnet 330 and the stationary part 310 of the arrangement) that is larger than a radial distance 340 (between the magnet 330 and the stator 332).

Optionally, the axial distance 350 is at least twice the radial distance 340.

Figure 4:
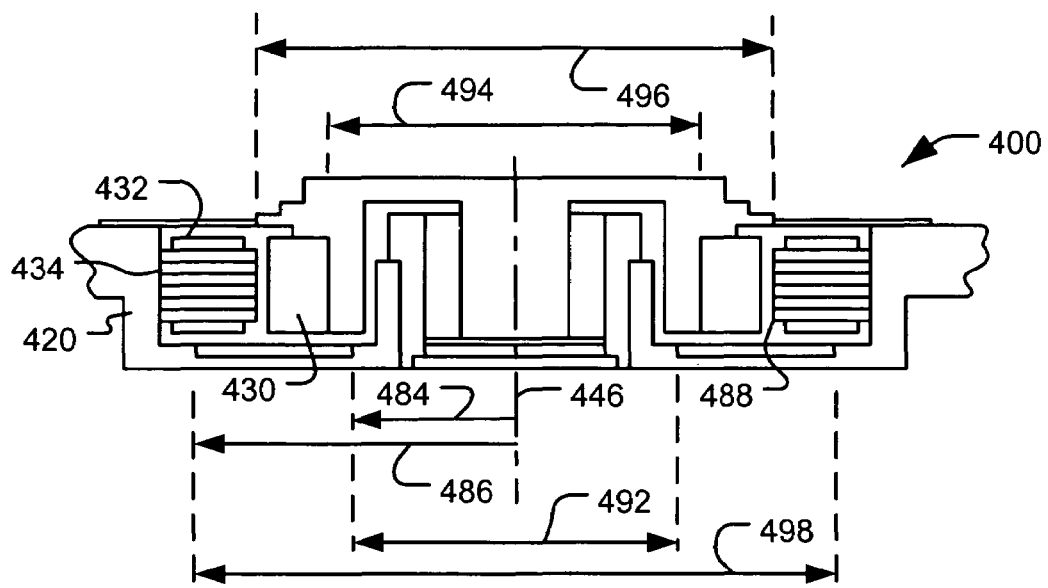
FIG. 4 is a cross-sectional view of a motor base assembly according to yet another embodiment

In some embodiments, the product housing itself forms part of the motor. Such assemblies may be referred to as motor base assemblies. FIG. 4 shows an example of a motor base assembly 400 according to an embodiment of the present invention. Using a motor base assembly helps to achieve low overall height, since the base of the motor is part of the housing of the product. In other words, the motor is missing its own base and part of an external assembly 420 serves in place of the missing base. Part of FIG. 4 is shown enlarged in FIG. 5 for easier reference.

The base 420 includes a recess 470 that is defined by a first wall 474 and a second wall 476. The recess 470 is spaced from the magnet 430 by a distance referred to as the axial distance 450. The magnet 430 is also spaced from the stator 432 by a distance referred to as the radial distance 440. The axial distance 450 is larger than the radial distance 440, preferably as much as two times.

The first wall 474 is located at a first radial location 484 from the axis 446 of rotation of the motor (or some other convenient reference), and the second wall 476 is located at a second radial distance 486. The magnet 430 may be located completely above the recess 470. That is, the whole magnet 430 may be found somewhere between the first radial location 484 and the second radial location 486, at a different elevation from the recess 470. The surface or end 488 of the stator 432 nearest the magnet 430 is preferably found at a radial location between the first radial location 484 and the second radial location 486.

Alternatively, the magnet 430 may be described as having a "back" side 490 that faces away from the stator 432 and a "front" side 492 that faces the stator 432. The magnet 430 may be arranged entirely over the recess 470, to the extent where the first wall 474 is located beyond the back 490 of the magnet. In other words, the assembly 400 is configured such that a positive "back space" 478 can defined in the recess 470 by the first wall 474 and an imaginary extension of the back 490 of the magnet. The stator 432 may be positioned over the second wall 476 of the recess 470 so that the whole of the clearance or separation 440 between the stator 432 and the magnet 430 is above the recess 470. Put in another way, in embodiments where the arrangement of magnets 430 has a smaller diameter than the arrangement of stators 432 such as the example of FIG. 4, the motor or the motor base assembly 400 may be configured so that the inner diameter 492 of the recess 470 is smaller than the inner diameter 494 of the magnet 430, and so that the inner diameter 496 of the stator 432 is smaller the outer diameter 498 of the recess 470.

Optionally, there may be provided in the recess 470 a second material 500 that is characterized by a magnetic reluctance that is higher than the magnetic reluctance of a first material 502 forming the base 420. In some cases, the second material 500 may be a non-magnetic. Depending on the choice of materials, the second material 500 can offer benefits such as increasing the stiffness of the overall structural component or base 420 on which the recess 470 is formed. Additionally, the non-magnetic material or the material of higher magnetic reluctance 500, in filling up fully or partially the recess 470, provides improved damping of any vibrations that may arise from the motor base assembly 400. One envisioned configuration includes a first material 502 of steel to form the base 420 and a second material 500 of aluminum for a stiffener. In one example, an aluminum component 500 having a complementary profile is mated with the recess 470. The second material 500 may alternatively be an adhesive. Possible selections for use as the second material 500 include epoxies and metal alloys. In another embodiment, more than one material is provided in the recess 470. As an example, a third material 501 such as an epoxy may be applied between the second material 500 and the first material 502. In such embodiments, the axial distance 450 from the magnet 430 to the first material 502 of the base 420 is larger than the radial distance 440 between the magnet 430 and the stator 432. In some embodiments, the axial distance 450 is at least twice as large as the radial distance 440.

Figure 6:
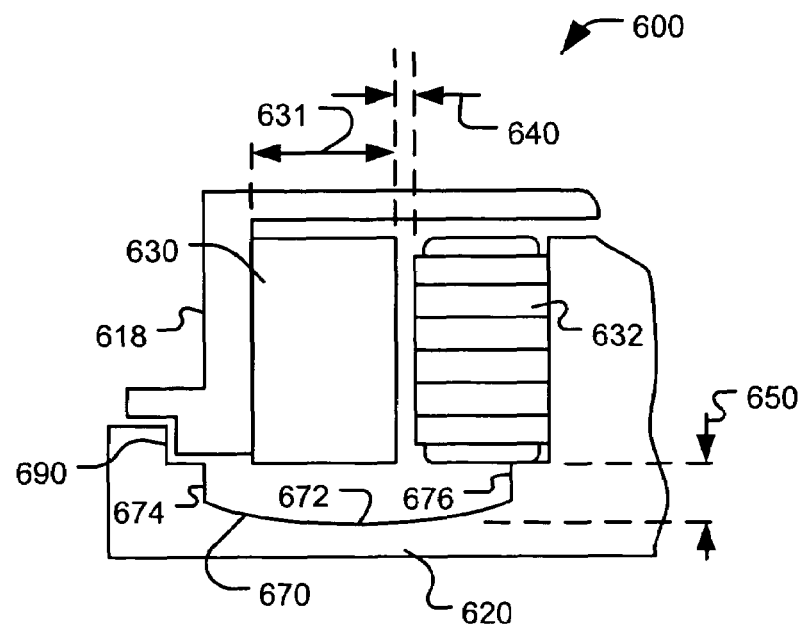
FIG. 6 is a cross-sectional view of an alternative embodiment.
Figure 5:
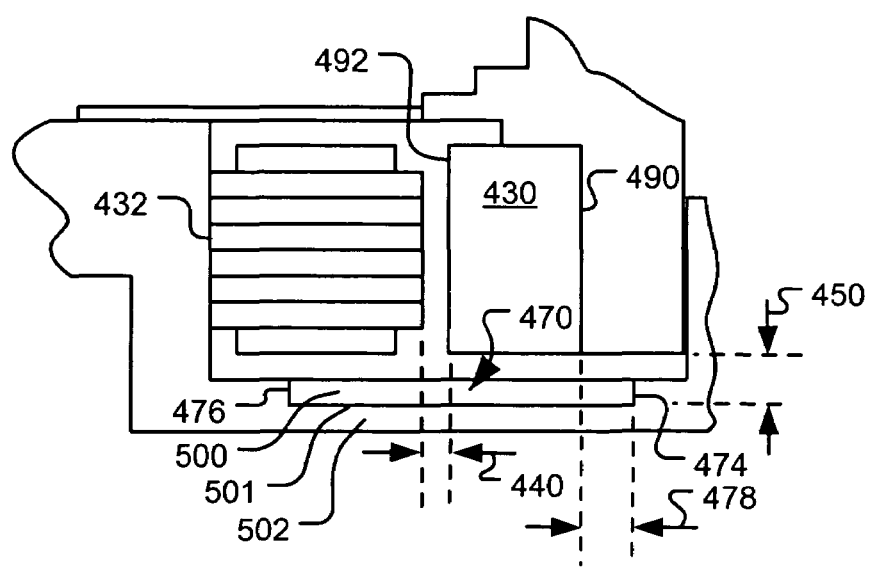
FIG. 5 is an enlarged view of part of FIG. 4.

The recess 470 as shown in FIG. 5 has a u-shaped or a somewhat rectilinear profile, but it will be understood that other profiles can be used. As an example, FIG. 6 shows a recess 670 of a different profile.

According to another contemplated embodiment, a motor base assembly 600 (shown partially in FIG. 6, in cross-section) includes an annular depression in its base 620. The depression has a floor 672 that is flanked by first and second circumferential sidewalls 674, 676. This depression 670 sits in a larger cavity 690 in the base 620. The cavity 690 may be shaped to receive the other parts of the motor such as the magnet 630, the stator 632, or part of the hub 618. The motor base assembly 600 is configured such that an axial distance 650 from the magnet 630 to the base 620 is at least twice a radial distance 640 from the magnet 630 to the stator 632. In this manner, the magnetic reluctance of the base 620 can be increased without increasing the actual height or thickness of the motor base assembly 600.

Optionally, the recess 670 may be defined by a first wall 674 and a spaced apart second wall 676. The first wall 674 is optionally spaced far enough from the second wall 676 such that the whole thickness 631 of the magnet 630 is above the recess 670.

Advantageously, the recess (such as 360, 470, 670) allows for alignment of the magnet centerline (such as 360) with the stator centerline (such as 362). By changing the magnetic reluctance, one can reduce the resistance forces that the motor must overcome. This in turn results in a motor (such as 202) or a motor base assembly (such as 400) with lower bearing friction. It is therefore possible, with embodiments of the present invention, to provide low-height motors with low power consumption without sacrificing the performance of the motors in areas of vibration or noise. It can therefore be appreciated that such motors or motor base assemblies would be particularly useful in consumer electronics applications.

Another advantage provided by embodiments of this invention is in the potential cost saving. Steel is a relatively cheap material of sufficient stiffness, and is often used in forming the base or supporting structure near the magnets. After machining, stamping, or heating, most steel materials are magnetic and thus would contribute to higher power consumption of the motor, particularly when the motor is starting operations. But by implementing embodiments of the present invention, it can be seen that power consumption can be decreased without the need to replace the steel base. Keeping the costs of making a motor low is an important benefit to the end-consumer as it helps to make storage and lightweight mobile consumer electronics more affordable. Embodiments of this invention also offers advantages over a base that is made solely from aluminum or other less magnetic materials as compared to steel, because steel has higher stiffness and better damping properties.

It is to be understood that even though numerous characteristics and advantages of various embodiments of the present invention have been set forth in the foregoing description, together with details of the structure and function of various embodiments of the invention, this disclosure is illustrative only, and changes may be made in detail. The detailed structure of other parts of the motor may vary while maintaining substantially the same functionality without departing from the scope and spirit of the present invention. For example, some motors have stationary shafts and others have rotatable shafts, and such variations are not outside the scope of the present invention. It will be appreciated by those skilled in the art that the teachings of the present invention can be applied to other systems without departing from the scope and spirit of the present invention.

What is claimed is:

1. A motor comprising:
a rotor;
an arrangement of magnets coupled to the rotor;
a stationary base; and
an arrangement of stators coupled to the base,
wherein the stationary base forms a recess defined by a inner wall at a first radial distance from an axis of rotation of the motor and an outer wall at a second radial distance from the axis of rotation of the motor, wherein the first radial distance is shorter than the second radial distance,
wherein the arrangement of magnets is closer to the axis of rotation of the motor than to the outer wall of the recess and further from the axis of rotation of the motor than from the inner wall of the recess, and
wherein the arrangement of magnets is further from the stationary base than from the arrangement of stators.

2. The motor of claim 1 in which the arrangement of magnets is in alignment with the arrangement of stators in a plane that is substantially perpendicular to the axis of rotation of the motor.

3. The motor of claim 1 in which the arrangement of magnets is at least twice as far from the stationary base as from the arrangement of stators.

4. The motor of claim 1, wherein the stationary base comprises a magnetic material, wherein the assembly further comprises component within the recess, wherein the component within the recess consists of non-magnetic material.

5. The motor of claim 4, wherein the magnetic material is steel.

6. The motor of claim 4, wherein the component comprises aluminum.

7. The motor of claim 4, wherein the component within the recess has a complimentary profile mated with the recess.

8. The motor of claim 4, further comprising an adhesive between the component within the recess and the stationary base.

9. The motor of claim 1, wherein the recess surrounds the axis of rotation of the motor.

10. The motor of claim 9, wherein the recess is further defined by a contiguous surface between the inner wall and the outer wall that faces the arrangement of magnets.

11. The motor of claim 1, wherein a side of the arrangement of stators adjacent to the arrangement of magnets is at a third radial distance relative to the axis of rotation of the motor, wherein the third radial distance is between the first radial distance and the second radial distance.

12. The motor of claim 1, wherein the stationary base comprises a magnetic material, wherein the assembly further comprises an aluminum material with a complimentary profile mated with the recess.

13. The motor of claim 1, wherein the stationary base comprises a magnetic material, wherein the assembly further comprises a non-magnetic material with a complimentary profile mated with the recess.

14. An assembly comprising:
a rotor;
an arrangement of magnets coupled to the rotor;
a stationary base;
an arrangement of stators coupled to the base,
wherein the stationary base forms a recess defined by a inner wall at a first radial distance from an axis of rotation of the motor and an outer wall at a second radial distance from the axis of rotation of the motor, wherein the first radial distance is shorter than the second radial distance,
wherein the arrangement of magnets is closer to the axis of rotation of the motor than to the outer wall of the recess and further from the axis of rotation of the motor than from the inner wall of the recess, and
wherein the arrangement of magnets is further from the stationary base than from the arrangement of stators; and
a media disc for storing data, wherein the media disc is coupled to the rotor.

15. The assembly of claim 14 in which the arrangement of magnets is at least twice as far from the stationary base as from the arrangement of stators.

16. The assembly of claim 14 in which the arrangement of stators is aligned with the arrangement of magnets in a plane that is substantially perpendicular to the axis of rotation of the motor.

17. The assembly of claim 14, wherein the stationary base comprises a magnetic material, wherein the assembly further comprises a component within the recess, wherein the component within the recess consists of a non-magnetic material.

18. The assembly of claim 17 further comprising an adhesive between the component within the recess and the stationary base.

19. The assembly of claim 17 in which the non-magnetic material is an epoxy.

20. The assembly of claim 17, wherein the magnetic material is steel.

21. The assembly of claim 17, wherein the component within the recess comprises aluminum.

22. The assembly of claim 17, wherein the component within the recess has a complimentary profile mated with the recess.

23. The assembly of claim 14 in which the stationary base part of a housing encasing the media disc.

24. The assembly of claim 14, further comprising a housing coupled to the stationary base, and in which the media disc is disposed in the housing.

25. The assembly of claim 14, further comprising a transducer for reading the data stored on the media disc.

26. The assembly of claim 14, wherein the recess surrounds the axis of rotation of the motor.

27. The assembly of claim 26, wherein the recess is further defined by a contiguous surface between the inner wall and the outer wall that faces the arrangement of magnets.

28. The assembly of claim 14, wherein a side of the arrangement of stators adjacent to the arrangement of magnets is at a third radial distance relative to the axis of rotation of the motor, wherein the third radial distance is between the first radial distance and the second radial distance.

29. An assembly comprising:
a rotor;
an arrangement of magnets coupled to the rotor;
a stationary base;
an arrangement of stators coupled to the base,
wherein the stationary base forms a recess defined by a inner wall at a first radial distance from an axis of rotation of the motor and an outer wall at a second radial distance from the axis of rotation of the motor, wherein the first radial distance is shorter than the second radial distance,
wherein the arrangement of magnets is closer to the axis of rotation of the motor than to the outer wall of the recess and further from the axis of rotation of the motor than from the inner wall of the recess, and
wherein the arrangement of magnets is further from the stationary base than from the arrangement of stators; and
a media disc for storing data, wherein the media disc is coupled to the rotor,
wherein the stationary base comprises a magnetic material, wherein the assembly further comprises a non-magnetic material with a complimentary profile mated with the recess.

30. The assembly of claim 29, wherein the non-magnetic material is an aluminum material.

31. The assembly of claim 29, further comprising an adhesive between the non-magnetic material and the stationary base.

32. The assembly of claim 29 in which the arrangement of magnets is at least twice as far from the stationary base as from the arrangement of stators.

* * * * *